Dec. 5, 1961 — P. P. LOVE — 3,011,838
PLAIN BEARINGS
Filed March 16, 1959 — 4 Sheets-Sheet 1

INVENTOR
PHIL P. LOVE

BY
Pierce, Scheffler & Parker
ATTORNEY

Dec. 5, 1961  P. P. LOVE  3,011,838
PLAIN BEARINGS

Filed March 16, 1959  4 Sheets-Sheet 2

INVENTOR
PHIL P. LOVE

BY
Pierce, Scheffler + Parker
ATTORNEY

Dec. 5, 1961 P. P. LOVE 3,011,838
PLAIN BEARINGS
Filed March 16, 1959 4 Sheets-Sheet 3

INVENTOR
PHIL P. LOVE
BY Pierce, Scheffler & Parker
ATTORNEY

Dec. 5, 1961 P. P. LOVE 3,011,838
PLAIN BEARINGS
Filed March 16, 1959 4 Sheets-Sheet 4

INVENTOR
PHIL P. LOVE

BY
Pierce, Scheffler + Parker
ATTORNEYS

3,011,838
PLAIN BEARINGS
Phil Prince Love, Alperton, Wembley, England, assignor to The Glacier Metal Company Limited, Middlesex, England, a company of Great Britain
Filed Mar. 16, 1959, Ser. No. 799,664
Claims priority, application Great Britain Mar. 19, 1958
16 Claims. (Cl. 308—122)

This invention relates to plain cylindrical bearings, that is to say, bearings comprising an annular stationary outer bearing member formed either in a single piece or in two or more circumferential parts (as is more common, in two semi-cylindrical circumferential parts) with a cylindrical journal (herein assumed to be a shaft) mounted therein.

The invention relates in particular to plain cylindrical bearings of the type (herein called for convenience "the spiral type") in which the bearing surface of the outer bearing member is not of true cylindrical form but has a cross section substantially in the form of a spiral extending over 360° and beginning and ending at a step (hereinafter called the principal step), and in which the arrangement is such that the clearance between the journal and the bearing surface decreases progressively around the journal and then increases abruptly in the region of the principal step from a minimum to a maximum in the direction of oil flow induced by rotation of the journal relatively to the outer bearing member, whereby a desirable "pattern" of oil pressure tends to be created in the oil film around the journal. A plain cylindrical bearing of the spiral type is described in the present applicant's U.S. Patent No. 2,679,438.

The present invention is particularly but not exclusively applicable to bearings for supporting the rotors of large high-speed turbines in which, apart from the problem concerned with the general turbine design of ensuring that the rotor does not normally run at any of the critical speeds and can pass through the lower-order critical speeds without harm, there is the problem of instability in the bearings commonly known as "oil film whip." Thus when oil film whip occurs there is a tendency for the shaft to precess within the clearance space in the bearing at approximately half the rotational speed of the shaft, this condition normally being experienced only when the specific load on the bearing is relatively light. It has accordingly been proposed to avoid the occurrence of oil film whip by reducing the size of the bearings so that the pressure on each bearing even at relatively light loads is sufficiently high. In high-speed turbines, however, designed to operate at, say, 3000 r.p.m., this higher speed increases the load-carrying capacity of the oil film in the bearings, other factors being equal, and in order to get a sufficiently high specific load to suppress oil film whip, the bearings would have to be unacceptably narrow. Oil film whip can, however, be suppressed by designing the bearings to have parasitic loads caused by pressures developed in the oil film solely by rotation of the shaft and irrespective of externally applied loads, and one way in which this can be done is described in the U.S. Patent No. 2,679,438 referred to above.

The present invention also deals with the same general problem and aims at providing bearings constituting one or more improvements over bearings of the kind described in the mentioned patent.

According to one feature of the present invention the substantially spiral cross section of the bearing surface of the outer bearing member of a plain cylindrical bearing of the spiral type referred to is interrupted by a second auxiliary step such that at the auxiliary step the clearance between the bearing and the journal is abruptly reduced in the direction of rotation of the journal.

Preferably, the auxiliary step is located at a position diametrically opposite to that of the principal step. This will ensure convergence of the oil film clearance and thereby eliminate any danger of cavitation in the oil. With such an arrangement, moreover, passage means are preferably provided by which oil can be fed under pressure to the bearing surface along a strip of relatively small width which extends lengthwise of the bearing in that region immediately to one side of the principal step where the clearance between the outer bearing member and the journal is a maximum.

The outer bearing member is preferably so orientated that at any cross section of the bearing a radius drawn from the axis of the bearing to the principal step is inclined by the same angle $\theta$ to a radius drawn from the axis of the bearing in the direction of the maximum load, the angle $\theta$ lying between 30° and 70°, and the principal step being located downstream of the point at which the second-mentioned radius intersects the bearing surface. In the case where the maximum load acts vertically downwards, the second-mentioned radius will thus extend vertically downwards from the axis of the bearing. The angle $\theta$ may be approximately 50°.

The term "downstream" as used herein refers, at any given cross section of the bearing, to the direction in which the oil entrapped between the journal and the outer bearing member tends to be moved, circumferentially of the journal, by relative rotation of the journal and the outer bearing member. The term "upstream" refers to the direction opposite to that denoted by "downstream."

Preferably, the height of the auxiliary step lies between 0.0015 inch and 0.0025 inch, and the height of the principal step lies between 0.02 inch and 0.03 inch.

Preferably, the average of the radial clearances between the journal and the outer bearing member at positions respectively immediately downstream of the auxiliary step and immediately upstream of the principal step lies between 0.0025 inch and 0.0045 inch.

The outer bearing member may be formed in two circumferential parts each having a semi-cylindrical or substantially semi-cylindrical inner bearing surface, in which case the principal step and the auxiliary step are preferably located respectively at the two joint faces of the circumferential parts. In the case where the inner bearing surface of each of the two circumferential parts is semi-cylindrical, conveniently the two inner bearing surfaces have different radii of curvature and have their centres of curvature suitably displaced from one another so as to provide the required spiral form of bearing surface. Conveniently, each of the two circumferential parts has a substantially semicylindrical outer surface, the outer surface of one of the parts being coaxial with its inner bearing surface while that of the other part has its axis of symmetry displaced in the plane of the joint faces from the axis of symmetry of its outer surface.

In bearings of the kind referred to according to the invention the clearance in the upper half of the bearing is large compared with that in the lower half of the bearing and the downward oil pressure on the shaft together with the weight of the shaft assembly might not be sufficient to balance the upward pressure over the lower half of the bearing surface and to maintain the shaft at a high enough eccentricity in relation to the lower half of the bearing. As a result eccentricity of the shaft attitude would be reduced and this would interfere with the desired purpose of the arrangement. In order to prevent this, and according to another feature of the invention, a part of the bearing surface upstream of the principal step and downstream of the auxiliary step may be provided with an arrangement of grooves communicating with the oil film surrounding the journal, means being provided for bleeding off oil from such grooves through an adjustable pressure-relief valve in order to maintain a predetermined pressure in such grooves. The number of grooves may vary but conveniently at least two generally parallel and similar grooves are provided, the grooves being spaced from one another lengthwise of the bearing and each extending circumferentially of the bearing surface, each groove communicating through a bleed-off passage with the adjustable pressure-relief valve. The result of such an arrangement is that the oil pressure diagram in the lower part of the bearing is split into three small lobes along the length of the bearing instead of the one large lobe which would be present without the grooves. Moreover the pressure relief valve can be set in such a manner that the total area of the three lobes will be less than would be the area of the single lobe referred to, and it will be obvious that the valve can be adjusted in such a way as to maintain the desired eccentricity of attitude of the shaft in the lower half of the bearing.

Conveniently, each groove is placed in intercommunication with the next adjacent groove or grooves by way of a common passage which extends lengthwise of the outer bearing member through the walls of the grooves, there being a common bleed-off passage communicating with the common passage.

In some cases, for example in bearings for steam turbines, it is the practice before starting up and stopping the turbines to jack up the shaft on a film of oil by delivering oil under high pressure to the lower parts of the bearings, and in an arrangement according to the invention as above described embodying grooves and a pressure-relief valve the passage leading to the pressure relief valve may not only be used to permit escape of oil through the pressure relief valve but may also be employed for the delivery of oil under pressure at the beginning and end of running operations in order to jack up the shaft on an oil film in the manner referred to, suitable control means being provided for this purpose. Thus this arrangement may have the advantage of avoiding a separate jacking recess in the bearing surface as has hitherto been employed and which can in some instances be a source of cavitation in the oil film, which cavitation tends to be avoided if circumferentially extending grooves as described above are used.

The control means and the pressure-relief valve may be afforded by valve apparatus of the kind described in the present applicant's copending application Ser. No. 817,095, filed June 1, 1959.

In addition to the problem of oil whip referred to above, the problem of avoiding oil foaming frequently occurs in high speed turbines especially where the governing system is operated from the same oil source as the bearing lubrication since such foaming tends to upset the sensitivity of the governing system.

To reduce the risk of oil foaming in accordance with a further feature of the present invention oil is fed under pressure to the bearing surface along the strip referred to by way of a narrow slot formed in the bearing surface and extending lengthwise of the bearing, the side of the slot distant from the journal communicating with an oil-supply passage or passages formed in the outer bearing member, and the cross-sectional area of the slot in the direction perpendicular to the direction of oil flow through it being less than the corresponding effective cross-sectional area of the oil-supply passage or passages so as to tend to maintain a substantially constant oil pressure throughout the length of the slot.

Preferably the length of the narrow slot is at least 90% of the length of the bearing, and the slot is located symmetrically between opposite ends of the bearing. The width of the slot in the direction perpendicular to the direction of flow of oil through it is preferably between 1½ and 3 times the height of principal step.

Conveniently, the oil-supply passage or passages formed in the outer bearing member comprise a cavity formed in the outer wall of the outer bearing member from which cavity a series of parallel passages lead to a common oil-feed passage which extends lengthwise of the outer bearing member and is in communication along its length with that side of the narrow slot distant from the journal, oil being supplied under pressure to the cavity by way of a port formed in the housing which surrounds the outer bearing member.

The bearing may be provided at its ends with weirs designed to prevent foaming of the oil emerging at the ends of the bearing and of the form described in the present applicant's copending application Ser. No. 799,665, filed March 16, 1959. In this case, the narrow slot conveniently communicates at each of its opposite ends with an oil bleed groove of relatively small cross section, each oil bleed groove extending from the end of the narrow slot concerned, in a direction outwardly inclined from the downstream direction of the oil within the oil film in the bearing, to the surface of that weir which is located near the end of the narrow slot concerned.

The invention may be carried into practice in a number of ways, but one specific embodiment of a plain cylindrical bearing will now be described by way of example with reference to the accompanying drawings of which.

Figure 1:
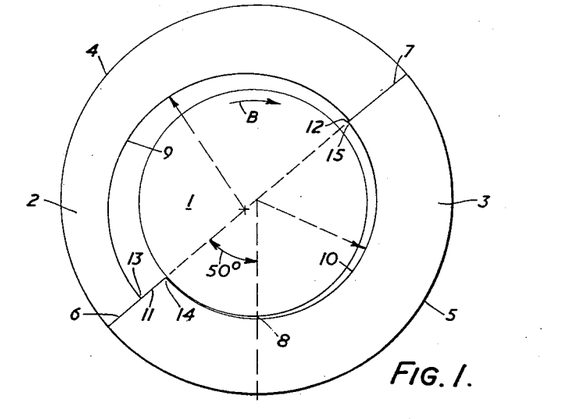
FIGURE 1 is a greatly simplified cross section of the plain cylindrical bearing in which the shape of the outer bearing member has been greatly exaggerated in order to show clearly the spiral form of cross-section of the bearing.

FIGURE 1 shows diagrammatically a bearing according to the invention comprising a journal 1 (assumed to be carrying a vertical load) mounted within an outer bearing member having two substantially semi-cylindrical annular co-operating parts 2 and 3 which will be referred to as the upper and the lower bearing members respectively.

The outer curved surfaces 4 and 5 respectively of the upper and the lower bearing members 2 and 3 are identical semi-cylindrical surfaces with a common axis of symmetry, the joint faces 6 and 7 of the upper and lower bearing members being co-planar and lying in a plane containing the axis of symmetry which is inclined at 40° to the horizontal. The arrangement is therefore such that the joint face 6 is angularly displaced 50° downstream of the lowest part 8 of the bearing surface, the direction of rotation of the journal 1 being clockwise in FIGURE 1, as indicated by the arrow B.

The lower bearing member 3 has a semi-cylindrical bearing surface 10 which is co-axial with its outer curved surface 5; the upper bearing member has a semi-cylindrical bearing surface 9 the axis of symmetry of which is parallel to but slightly displaced from the axis of symmetry of its outer curved surface 4, this displacement being in the plane of the joint faces 6 and 7 and towards the joint face 6.

The radii of curvature of the two semi-cylindrical bearing surfaces are different, that of the bearing surface 9 of the upper bearing member being greater than that of the bearing surface 10. The result is that the complete bearing surface of the outer bearing member is, in cross section, substantially in the form of a spiral extending through 360° and beginning and ending at a principal step 11 afforded by the lower bearing member 3 at the joint face 6. The spiral is interrupted, diametrically opposite to the principal step 11, by a second step 12, constituting the auxiliary step, which is afforded by the lower bearing member 3 at the joint face 7.

In a manner to be described below, oil under pressure is introduced into the bearing immediately downstream of the principal step 11, that is to say in the region 13. The clockwise rotation of the journal 1 causes the oil to be carried round clockwise through the clearance between the journal and the outer bearing member, the clearance diminishing progressively (except at the auxiliary step, where there is an abrupt decrease of clearance) to a minimum value immediately upstream of the principal step. The oil has also a component of velocity longitudinally of the bearing, and escapes at the ends of the bearing.

The displacement of the axes of symmetry of the bearing surfaces 9 and 10 should be chosen, in conjunction with the difference of the radii of curvature of these two surfaces and with the angular inclination to the horizontal of the plane of the joint faces 6 and 7, to give an eccentricity ratio for the bearing of at least 0.4, tests having indicated that this is the minimum value necessary to permit the journal to run under stable conditions and without oil film whip. In the present example the bearing proper is 3 inches long and the journal is 8 inches in diameter, the displacement of the axes of symmetry of the bearing surfaces 9 and 10 is 0.011 inch, the height of the principal step 11 is 0.024 inch, the height of the auxiliary step 12 is 0.002 inch, and the approximate mean operating clearances between the journal and the outer bearing member at the points 14 and 15 adjacent the principal and auxiliary steps respectively are 0.0015 inch and 0.0055 inch under a net load upon the journal of 4,500 lbs. The bearing thus has an eccentricity ratio of nearly 0.6. Eccentricity may be defined by the formula $$e = \frac{d}{C}$$

in which $e$ is eccentricity ratio, $d$ is the distance between the centers of curvature of the adjacent journal and bearing surfaces and $C$ is the difference between the radii of curvature of said adjacent surfaces.

With this arrangement, the converging cross section of the oil cavity tends, in generally known manner, to create a relatively high oil pressure on the lower part of the rotating journal and so to introduce a parasitic load upon the journal. Due, however, to the relatively large clearance above the journal, an excessively large oil pressure developed underneath the journal will tend to cause an undesired upward displacement of the journal. For this reason, oil bleed-off arrangements are provided.

These arrangements are shown in FIGURES 2, 4, 7, 8 and 9. As already mentioned, in FIGURE 2 the outer bearing member has been rotated through an angle of 50° from its actual angular position.

In FIGURES 2 to 7 the upper and lower bearing members 2 and 3 comprise steel shells having linings, 19 and 20 respectively (FIGURES 2–4), which are of white metal and provide the actual bearing surfaces.

For the purpose of the dimensions given above in relation to FIGURE 1 the linings were treated as included within the bearing members 2 and 3.

Figure 2:
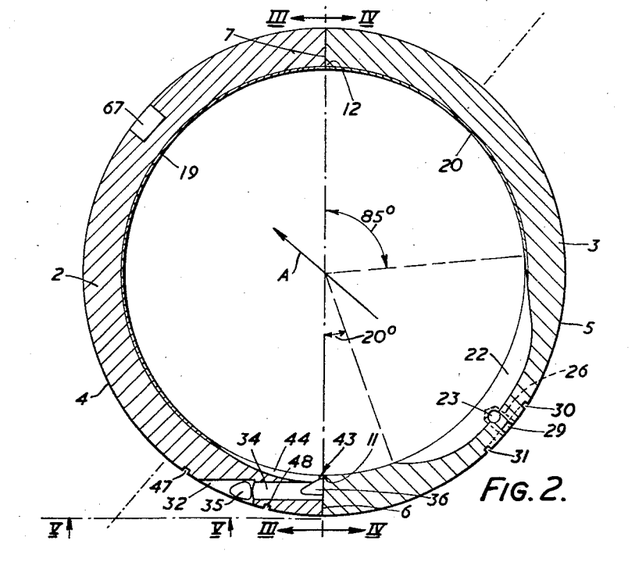
FIGURE 2 is a cross section of the outer bearing member of the plain cylindrical bearing, in which, for convenience of illustration the cross section has been rotated in a vertical plane through such an angle that the joint faces of the two semi-cylindrical halves of the outer bearing member apparently lie in a vertical plane, the true vertical direction being indicated by the arrow A; the left-hand half of FIGURE 2 is a central section taken along the line II—II of FIGURE 3, and the right-hand half of FIGURE 2 is a non-central section taken along the line II—II of FIGURE 4.
Figure 4:
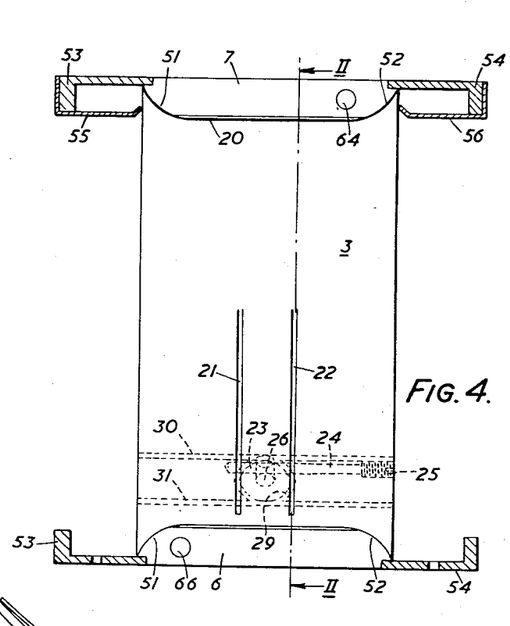

The lower bearing member 3 has formed in its bearing surface two relatively deep circumferentially extending parallel grooves 21 and 22 which commence 85° downstream of the auxiliary step 12 and end 20° upstream of the principal step 11. At the commencement of the grooves, the entry to the grooves is tangential to the adjacent bearing surface, while the grooves end comparatively abruptly. The two grooves are spaced at one-third intervals along the length of the bearing proper (excluding the length of the end weirs to be described below).

The two grooves are in intercommunication through a common passage 23 which is part of a bore 24 formed, longitudinally of the bearing, in the lower bearing member 3, the bore 24 being closed at its outer end by a plug 25.

Mid-way between the two grooves, a common bleed-off passage 26 extends from the outer curved surface 5 of the lower bearing member 3 to communicate with the common passage 23.

Figures 7, 8, 9:
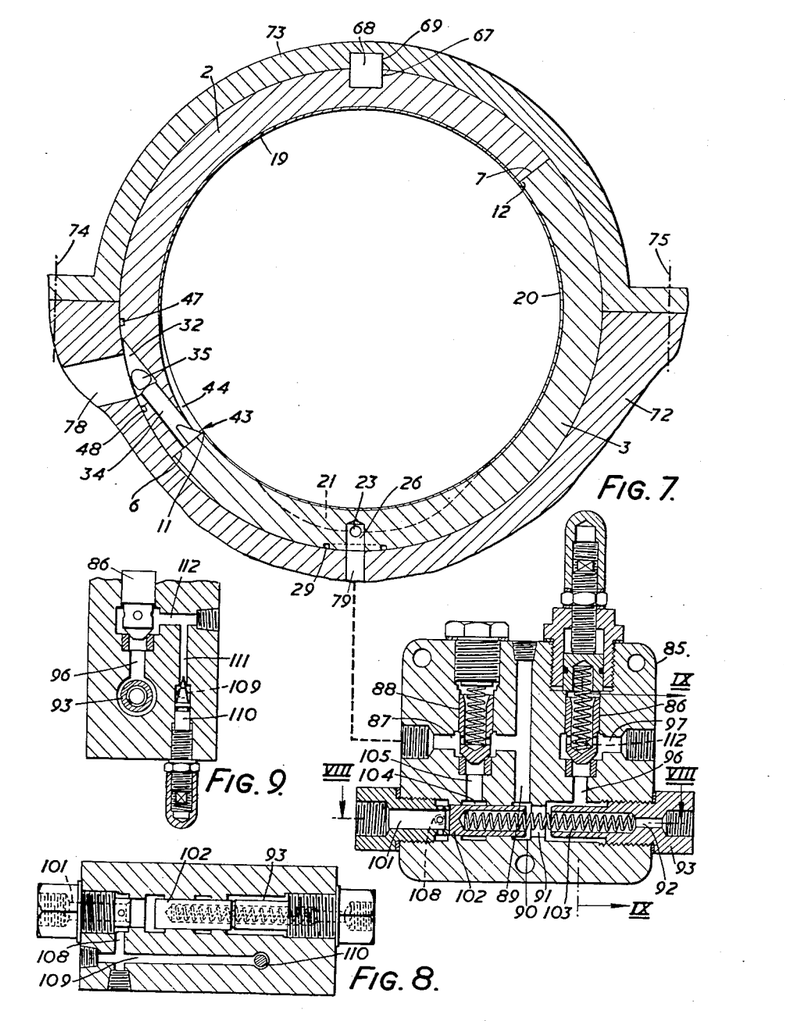
FIGURE 7 is similar to FIGURE 2 but shows in cross section, in the plane of the left-hand half of FIGURE 2, the plain cylindrical bearing mounted at its true inclination to the vertical within a housing, and shows also in longitudinal cross section valve apparatus, for control of the oil in the clearance of the bearing, constructed according to the present applicant's copending application Ser. No. 817,095 referred to above.
FIGURES 8 and 9 are cross sections of the valve apparatus shown in FIGURE 7, taken respectively along the lines VIII—VIII and IX—IX of FIGURE 7 (the shuttle-type valve 102 being shown operated in FIGURE 8 and unoperated in FIGURE 7).

To prevent oil under pressure from leaking from the common bleed-off passage 26 around the outer curved surface 5 of the lower bearing member 3 and so exerting pressure upon that surface, the outer curved surface 5 is provided with an arrangement of grooves comprising a circular groove 29 coaxial with the common bleed-off passage 26, and two similar grooves 30 and 31 which intersect the circular groove 29 tangentially and extend longitudinally of the curved surface 5 to communicate at their ends, when the outer bearing member is mounted in its housing as shown in FIGURE 7, with the atmosphere.

The means by which the oil pressure in the grooves 21 and 22 is controlled is described below.

Figure 5:
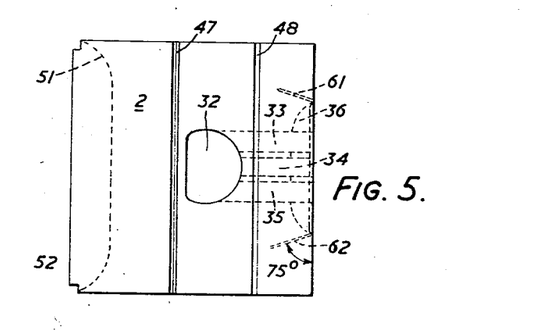
FIGURE 5 is an elevation, taken along the line V—V of FIGURE 2, of that half of the outer bearing member which lies at the left-hand side in FIGURE 2.
Figure 6:
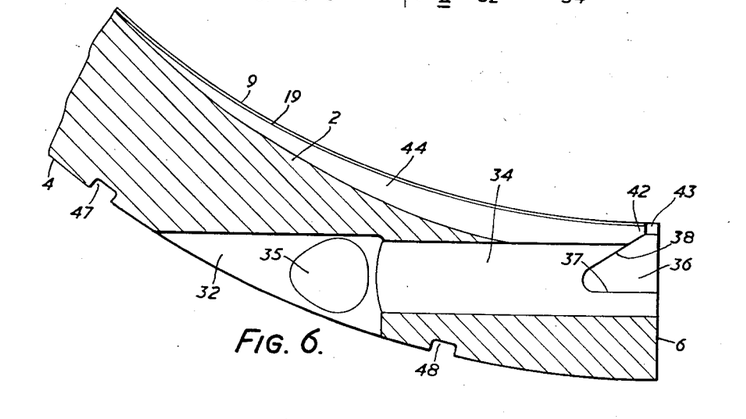
FIGURE 6 is an enlargement of part of the lower part of FIGURE 2, showing the narrow slot by means of which oil is fed under pressure to the bearing during normal operation.

The arrangement for the supply of oil to the bearing is shown in FIGURES 2 and 5, and, in enlargement, in FIGURE 6.

At about 20° downstream of the joint face 6, a part-cylindrical cavity 32 is formed in the outer curved surface 5 of the upper bearing member 2. Three parallel and similar spaced passages 33, 34, 35 extend from the cavity 32 through the upper bearing member to the joint face 6 where the passages all communicate with a common oil-feed passage 36 which is formed in the joint face 6 of the upper bearing member 2 and which extends longitudinally of the bearing for about 90% of the length of the bearing proper (excluding the weirs). The common oil-feed passage 36 is of approximately triangular section, its base being formed by the joint face 6 of the lower bearing member 3, its outermost wall 37 being perpendicular to the joint face 6, and its innermost wall 38 being inclined by some 60° to its base.

The innermost wall 38 of the passage 36, and the bearing surface 9 of the upper bearing member, thus form between them an abutment 42 the face of which is removed to provide a slot 43 of relatively small width between the abutment 42 and the joint face 6 of the lower bearing member 3. The slot 43 is an oil-feed slot providing communication throughout its length between the common oil-feed passage 36 and the region 13 of the clearance between the journal and the outer bearing member.

The oil-supply system is designed to prevent foaming of the oil when supplied to the bearing, and this is effected by making the cross-sectional area of the oil-feed slot 43 in the direction perpendicular to that of the oil flow through the slot sufficiently less than the corresponding cross section of the passages feeding oil to the oil-feed slot. Thus, in the present arrangement, the slot is 2¾ inches long (the length of the bearing proper, excluding the weirs, being 3 inches), and has a width of between 0.050 and 0.055 inches. The part-cylindrical cavity may be cut with a 1½ inch diameter cutter, while the passages 33 to 35 are each ⅜ inch in diameter, the common oil-feed passage 36 is ⅜ inch deep, and, as will be described below, oil is supplied to the cavity 32 through a port 1 inch in diameter formed in the housing.

Midway along the bearing, a groove 44 is formed part-circumferentially of the bearing surface 9 of the upper bearing member 2, extending from the joint face 6 through an angle of 40°, towards the joint face 7. The groove 44 intersects the central passage 34 of the three parallel passages, and the central parts of the common oil-feed passage 36 and of the oil-feed slot 43.

Longitudinal grooves 47 and 48 extend lengthwise of the outer curved surface 4 of the upper bearing member 2 and serve, in similar manner to the grooves 30 and 31 upon the lower bearing member 3, to prevent oil under pressure from leaking from the cavity 32 to parts of the outer curved surface where any resultant oil pressure might affect the operation of the bearing.

Figure 3:
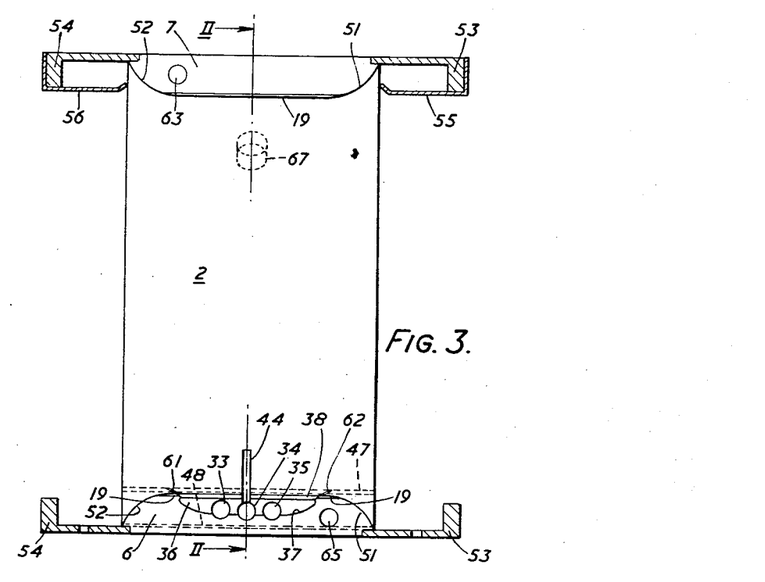
FIGURES 3 and 4 are side elevations of the two halves of the outer bearing member, taken respectively along the lines III—III and IV—IV of FIGURE 2.

Inspection of FIGURES 3 and 4 will show that, in longitudinal cross section, each of the bearing members 2 and 3 merges at each of its ends into an outwardly curved portion, 51 and 52 respectively, constituting a weir constructed according to the present applicant's co-pending application Ser. No. 799,665 referred to above. The extent of the bearing proper is indicated by the extent of the linings 19 and 20, and it will be seen that each of the weirs has a cross-section in the form of a circular arc which merges into the bearing surface afforded by the relevant lining 19 or 20. The weirs may be associated with collector rings 53 and 54, and with splash shields 55 and 56 which overhang the upper half of the journal, as shown fragmentarily in FIGURES 3 and 4, and as described more fully in the application referred to above.

Near each end of the bearing proper, the oil-feed slot 43 merges into an oil bleed groove, 61 and 62 respectively (FIGURES 3, 5), of relatively small cross section. Each oil bleed groove is formed in the bearing surface 9 of the upper bearing member 2, and leads from one end of the oil-feed slot to the surface of the relevant adjacent weir. As may be seen from FIGURE 5, the oil bleed grooves are arranged at an angle of some 15° to the "downstream" direction, that is to say to the direction of movement of the adjacent surface of the rotating journal, and extend towards the weirs.

The bearing members 2 and 3 are assembled in the correct relationship around the journal 1 with the aid of two dowel pins which are inserted respectively into two pairs of suitable bores 63 to 66 formed in the joint faces 6 and 7 of the bearing members.

The upper bearing member 2 is also provided in its outer curved surface and mid-way along its length with a radially inward extending bore 67 which lies diametrically opposite the common bleed-off passage 26. As may be seen from FIGURE 7, the bore 67 is designed to receive one end of a dowel pin 68 the other end of which is received by a bore 69 in the housing of the outer bearing member, the dowel pin 68 thus serving to locate the outer bearing member in its correct angular position (in this case, with the common plane of the joint faces 6 and 7 inclined at an angle of 40° to the horizontal) with the common bleed-off passage 26 at the lowest part of the arrangement.

FIGURE 7 shows the bearing mounted in its correct angular position in a conventional housing comprising a base part shown fragmentarily at 72 and a cap 73 secured to the base part as by bolts indicated at 74 and 75.

Oil is supplied to the cavity 32, and thence to the bearing surfaces in the manner described above, through an oil supply port 78 in the housing 72, the port 78 being 1 inch in diameter.

The common bleed-off passage 26, which is in communication with the grooves 21 and 22 as described above, also communicates, by way of an oil passage 79 in the housing 72, with valve apparatus constructed according to the present applicant's copending application Ser. No. 817,095 referred to above. This valve apparatus incorporates an adjustable pressure-relief valve 86 for control of the oil pressure in the grooves 21 and 22 of the bearing during normal operation, and also includes control means for supplying high-pressure oil to the grooves 21 and 22 during starting-up and stopping operations to jack up the journal on a film of oil.

For a detailed description of the valve apparatus, reference should be made to the application referred to above. Briefly, the valve apparatus comprises a solid, generally rectangular metal block 85 in which are formed a number of bores to receive valve elements and other parts, and a number of passages.

The oil passage 79 in the housing 72 is connected to a bearing oil passage 87. During normal operation, the passage 87 communicates, around the lower periphery of a non-return valve 88, with a vertical passage 89 which communicates by way of a port 90, to be referred to as the bearing-oil outlet port, with a horizontally extending bore 91. The bore 91 communicates on the one hand through the hollow interior 92 of a tubular plug 93 with a pressure gauge (not shown), and on the other hand by way of a passage 96 and the adjustable pressure-relief valve 86 with a relief passage 97 which is connected to an oil sump (not shown) or the equivalent.

On the other hand, during starting-up and stopping operations, high-pressure jacking oil is supplied, for example by means of a suitable pump (not shown), to the jacking-oil inlet passage 101, causing a shuttle-type valve 102 mounted within the left-hand end of the horizontally extending bore 91 to move to the right against the action of a helical compression spring 103. The shuttle-type valve 102 is shown in its operated position in FIGURE 8.

This movement of the valve 102 first closes the bearing-oil outlet port 90, thus disconnecting the sump and the pressure gauge from the bearing oil passage 87, and then uncovers the jacking-oil delivery port 104, placing this port in communication with the jacking-oil inlet passage 101. Jacking oil is then delivered through the port 104 and a passage 105 to the non-return valve 88 which permits the jacking oil to pass to the bearing-oil passage 87 and thence to the grooves 21 and 22 of the bearing.

When the supply of high-pressure jacking oil is shut off, the high pressure communicated to the journal of the bearing is released gradually, in two stages. Firstly, the pressure within the jacking-oil inlet passage 101 is allowed to decrease gradually, the oil leaking to the sump from the passage 101 through horizontal passages 108 and 109 (FIGURE 8), past an adjustable needle valve 110 (FIGURE 9), and through further passages 111 and 112 to the space surrounding the lower part of the relief valve 86 and thence by way of the relief passage 97 to the sump.

When the oil pressure in the jacking-oil inlet passage 101 has decreased sufficiently, the shuttle-type valve 102 moves to the left under the action of the helical spring 103 to first close the jacking-oil delivery port 104 and then open the bearing-oil outlet port 90. When this has occurred, the valve apparatus has returned to its normal state as described above, and the pressure of the high-pressure oil within the grooves 21 and 22 of the bearing will be relieved by discharge of oil to the sump by way of the relief valve 86.

It is believed that the operation of the specific embodiment will be broadly clear from the above description.

Thus, while the journal 1 rotates clockwise as seen in the drawings, oil under pressure is supplied to the bearing through the oil-feed slot 43 which is so arranged as to tend to prevent foaming of the oil. The oil is introduced in the region 13 immediately downstream of the principal step 11, this tending to prevent cavitation of the oil in the region of the principal step. Oil within the annular clearance between the journal and the outer bearing member tends to be carried around with the rotating journal in known manner, and the progressive reduction in the clearance causes a desirable "pattern" of oil pressure to be set up whereby a parasitic load is applied by the oil to the journal to tend to prevent oil film whip. The auxiliary step 12 diametrically opposite to the principal step 11 is intended to prevent cavitation in the oil film within the clearance.

The oil escapes from the bearing at each end of the bearing and, with correct design, flows over the surfaces of the weirs 51 and 52 to the collector rings 53 and 54, the splash shields 55 and 56 over the upper halves of the ends of the journal serving to prevent the oil from dripping down on to the journal.

The oil pressure in the clearance tends to be substantially constant along the length of the oil-feed slot 43, the leakage of oil from each end of the slot to the weirs by way of the oil bleed grooves 61 and 62 serving to ensure adequate oil flow.

Assuming for the moment that the common bleed-off passage 26 is closed, then the general "pattern" of the oil pressure which would, under these conditions, exist at other points around the periphery of the bearing which are angularly spaced from the oil-feed slot 43 may be estimated. In general, the oil pressure will tend to be a maximum at points which lie in the mid-plane of the bearing; further, for a given angular position, the oil pressure will decrease steadily from a maximum value at a point in this mid-plane to a minimum value at each end of the bearing proper. This general result follows from the fact that the oil escapes from the mid-plane of the bearing to each end of the bearing.

In addition, at any given cross section of the bearing the pressure of the oil within the clearance surrounding the journal will tend to vary with angular position, tending generally to increase in magnitude as the clearance diminishes.

With the construction shown, during normal operation of the bearing the "pattern" just mentioned is modified by the presence of the grooves 21 and 22 which, as described, are connected by way of the common bleed-off passage 26 through the adjustable pressure-relief valve 86 of the valve apparatus to the sump. It will be recalled that the grooves 21 and 22 are spaced at ⅓ intervals along the length of the bearing proper, and it will thus be seen, from general principles, that since with a given setting of the valve 86 (which can be adjusted with reference to the pressure gauge of the valve apparatus) the oil pressure within the grooves 21 and 22 will be held at predetermined value, the oil pressure at points along the length of the bearing having the same angular position will be modified to provide a 3-lobe "pattern."

Thus there will be, at a given angular position, three maximum values of the oil pressure, these maxima being located respectively at points mid-way between each groove 21 and 22 and the nearest end of the bearing proper, and at a point mid-way between the two grooves 21 and 22. Starting from one end of the bearing proper, adjacent to the weir at that end, the oil pressure will thus rise steadily to a maximum value ⅙ of the way along the bearing, and will then decrease steadily to a minimum value at the fist groove (21 or 22). Thereafter, the oil pressure again increases to a maximum value at the mid-plane of the bearing, the "pattern" being symmetrical at each end of the bearing. It will be understood that in this paragraph the terms "maximum value" and "minimum value" are used in the more general mathematical sense, that is to say they are used to denote points at which the oil pressure is respectively greater than, or less than, the local oil pressure at other points in the immediate neighbourhood of the points concerned.

By adjustment of the setting of the relief valve 86, the "minimum values" of the oil pressure, that is to say that pressure within the grooves 21 and 22, can be adjusted. These "minimum values" having been set, the "maximum values" referred to are thereby automatically determined.

Thus, by adjustment of the setting of the valve 86 the area of the "pattern," that is to say the total area of the 3 lobes, can be varied. It will thus be clear that adjustment of the valve 86 varies the magnitude of the parasitic load to which the journal is subjected.

Because of the presence of the auxiliary step 12, which effectively introduces an abrupt restriction in the flow of oil around the journal in the clearance, the modification as described of the oil "pattern" by the presence of the grooves 21 and 22 and the relief valve 86 is mainly confined to that portion of the oil cavity which lies between the journal and the lower bearing member 3. The pressure pattern within the other half of the clearance will tend to be unaffected by the action of the grooves, and to remain essentially of the unmodified form referred to above.

It is believed that the operation of the specific embodiment during jacking-up operations, that is to say when high-pressure oil is supplied to the jacking-oil inlet passage 101 of the valve apparatus under starting-up and stepping conditions, will be clear from the description given above. Briefly, the high-pressure oil is admitted to the grooves 21 and 22 to jack up the journal when the shuttle-type valve 102 has been automatically operated by the pressure of the high-pressure oil supply. When the high-pressure oil supply is shut off, the pressure decreases steadily and automatically to a value determined by the setting of the relief valve 86.

What I claim as my invention and desire to secure by Letters Patent is:

1. A plain bearing assembly comprising an annular stationary outer bearing member formed to receive a cylindrical journal, in which the bearing surface of the outer bearing member has in cross-section in planes normal to the axis of the bearing approximately the form of a spiral extending over 360° and beginning and ending at a step whereby, considered in the direction of rotation of the journal relatively to the outer bearing member, the clearance space between the bearing surface of the outer bearing member and the surface of the journal member increases abruptly from a minimum to a maximum at said step and then decreases progressively around the circumference of the outer bearing member until said step is again reached, and pressure control means communicating with the clearance space between the outer bearing member and the journal over at least that part of the region of such clearance space which extends 180° from the step in the direction in which the said clearance space progressively increases, said pressure control means permitting escape of oil from said part of said region at a predetermined pressure to maintain said predetermined pressure in said part of said region.

2. A plain bearing assembly as claimed in claim 1, in which the pressure control means includes a pressure-relieving vent in the part of the outer bearing member in the said region, and spring control relief valve means controlling the flow of oil through said pressure relieving vent.

3. A plain bearing assembly as claimed in claim 2, in which the eccentricity ratio, $e$, of the journal surface relative to any portion of the adjacent surface of the outer bearing member is greater than 0.4, where $$e = \frac{d}{C}$$

$d$ being the distance between the centres of curvature of the surface of the journal and the bearing surface of the said outer bearing member, and $C$ being the difference between the two radii of curvature of the said adjacent surfaces.

4. A plain bearing assembly as claimed in claim 3, in which at any cross-section of the bearing in a plane normal to its axis a radius drawn from the axis of the bearing to the step is inclined by the same angle $\theta$ to a radius drawn from the axis of the bearing in the direction of the maximum load, the angle $\theta$ lying between 30° and 70° and the step being located at a point relatively to said second mentioned radius such that the surface of the journal during operation intersects said second mentioned radius somewhat in advance of the step.

5. A plain bearing assembly as claimed in claim 4, in which the angle $\theta$ is approximately 50°.

6. A plain bearing comprising an annular stationary bearing member formed to receive a cylindrical journal, in which the bearing surface of the bearing member in cross-sections in planes normal to the axis of the bearing comprises a first spiral portion extending over a part of the circumference of the bearing member from a first step at which, considered in the direction of rotation of the journal relatively to the bearing member, the clearance space between the bearing member and the journal is abruptly increased, said first spiral portion providing a progressive reduction in the clearance space between the bearing member and the journal in said direction, and a second spiral portion extending from a second step at the end of said first spiral portion remote from said first step, said second step providing in the said direction an abrupt reduction in the clearance space between the bearing member and the journal and said second spiral portion also providing a progressive reduction in the clearance space between the bearing member and the journal in the said direction and terminating at said first step.

7. A plain bearing comprising an annular bearing member formed to receive a journal, said annular bearing member being formed in two circumferential parts, the bearing surfaces respectively on each of said parts when viewed in cross-sections in planes normal to the axis of the bearing being of a form providing a progressively diminishing clearance space between the bearing member and the journal in the direction of rotation of the journal within the bearing member, the form of the said bearing surfaces of the said two parts of the bearing member being such that regarded in the said direction of rotation of the journal there is a first step constituting an abrupt increase in said clearance space at the beginning of one of the said two circumferential parts while there is a second step representing an abrupt reduction in the said clearance at the beginning of the other of said two circumferential parts.

8. A plain bearing as claimed in claim 7, in which the two parts of the said bearing member abut one another in a plane containing the axis of the journal, the outer circumferential surface of the said bearing member in cross-sections in planes normal to said axis is of circular form, while each of the said two bearing surfaces is substantially semi-cylindrical and at least one of them has a centre of curvature which is appropriately displaced from the centre of curvature of the outer surface of the bearing member in the said plane in which the said two parts abut.

9. A plain bearing as claimed in claim 7, in which the height of the said first step is between 0.02 inch and 0.03 inch while the height of said second step is between 0.0015 inch and 0.0025 inch.

10. A plain bearing as claimed in claim 9, having therein passage means for the delivery of lubricating oil to the bearing including a passage communication with the bearing surface along a strip extending lengthwise of the bearing in the region immediately on the large clearance side of the first step.

11. A plain bearing as claimed in claim 10 in which the length of the said passage is at least 90% of the length of the bearing member and the passage is located approximately symmetrically between the ends of the bearing member.

12. A plain bearing assembly as claimed in claim 1 in which there are formed in the bearing member in the said region of the said clearance space at least one groove communicating with the clearance space between the journal and the bearing member, said groove communicating with pressure control means comprising a pressure relief valve constructed to maintain a predetermined pressure in said groove during operation.

13. A plain bearing assembly comprising an annular stationary outer bearing member formed to receive a cylindrical journal, in which the bearing surface of the outer bearing member has in cross-section in planes normal to the axis of the bearing approximately the form of a spiral extending over 360° and beginning and ending at a step whereby, considered in the direction of rotation of the journal relatively to the outer bearing member, the clearance space between the bearing surface of the outer bearing member and the surface of the journal member increases abruptly from a minimum to a maximum at said step and then decreases progressively around the circumference of the outer bearing member until said step is again reached, and pressure control means communicating with the clearance space between the outer bearing member and the journal over at least that part of the region of such clearance space which extends 180° from the step in the direction in which the said clearance space progressively increases, said pressure control means permitting escape of oil from said part of said region at a predetermined pressure to maintain said predetermined pressure in said part of said region, said pressure control means comprising at least two approximately parallel and similar grooves extending circumferentially of the part of the bearing surface in the said region and spaced apart from each other axially of the bearing member, and a pressure relief valve communicating with said grooves and constructed to maintain a predetermined pressure.

14. A plain bearing assembly as claimed in claim 13 including oil delivery means whereby oil under high pressure can be delivered to the said grooves to jack up the said journal on an oil film, and means whereby when said oil delivery means delivers said oil under pressure the said pressure control means are automatically rendered inoperative.

15. A plain bearing assembly as claimed in claim 1 including passage means for the delivery of lubricating oil continuously to a point adjacent to said step where the clearance between said bearing member and said journal is approximately at a maximum.

16. A plain bearing assembly comprising an outer annular bearing member formed to receive a cylindrical journal and comprising two semi-annular parts abutting approximately in a plane containing the axis of the journal, said bearing member having a cylindrical outer circumferential surface, a housing having a cylindrical inner surface within which said bearing member is disposed and clamped, the inner circumferential surfaces of the said parts of the said bearing member each being of approximately cylindrical form with the centre of curvature of at least one of said surfaces displaced in the said plane from the centre of curvature of the outer cylindrical surface of its associated bearing member while the radius of curvature of the inner circumferential surface of one of said parts is less than the radius of curvature of the inner circumferential surface of the other of said parts whereby, at one of the points where said inner circumferential surfaces meet, a first step representing, in the direction of rotation of the journal, a sudden increase in clearance between the surface of the bearing member and the surface of the journal is formed while, at the other of the points where said inner circumferential surfaces meet, a second step of smaller depth than the said first step and representing in the said direction a sudden reduction in the said clearance is formed, at least one circumferentially extending groove being formed in the inner surface of the bearing member in the area situated between 20° and 180° on the side of said first step where the clearance is smaller, oil supply passage means communicating with the clearance space between the said bearing member and the journal at a point immediately on the large clearance side of the said first step, and pressure control means communicating with said groove and comprising pressure control valve apparatus to maintain a determined pressure automatically in said groove.

References Cited in the file of this patent

UNITED STATES PATENTS

| | | |
|---|---|---|
| 1,378,559 | Roberts | May 17, 1921 |
| 2,679,438 | Love | May 25, 1954 |
| 2,760,832 | Bidwell | Aug. 28, 1956 |